United States Patent
Beatty

[11] 3,944,638
[45] Mar. 16, 1976

[54] PROCESS FOR PREPARING METAL-CARBIDE-CONTAINING MICROSPHERES FROM METAL-LOADED RESIN BEADS

[75] Inventor: Ronald L. Beatty, Oak Ridge, Tenn.

[73] Assignee: The United States of America as represented by the United States Energy Research and Development, Washington, D.C.

[22] Filed: June 18, 1974

[21] Appl. No.: 480,323

[52] U.S. Cl. ................................................ 264/.5
[51] Int. Cl.² ........................................ G21C 21/00
[58] Field of Search ....................................... 264/.5

[56] References Cited
UNITED STATES PATENTS

| | | | |
|---|---|---|---|
| 3,321,560 | 5/1967 | Wilkinson | 264/.5 |
| 3,619,428 | 11/1971 | David | 264/.5 |
| 3,723,338 | 3/1973 | Godfrey | 264/.5 X |
| 3,773,682 | 11/1973 | Marshall et al. | 264/.5 X |
| 3,776,987 | 12/1973 | Grimes et al. | 264/.5 |
| 3,865,745 | 2/1975 | Block et al. | 264/.5 X |

*Primary Examiner*—Stephen C. Bentley
*Assistant Examiner*—Peter A. Nelson
*Attorney, Agent, or Firm*—Dean E. Carlson; David S. Zachry; Irving Barrack

[57] ABSTRACT

An improved method for treating metal-loaded resin microspheres is described which comprises heating a metal-loaded resin charge in an inert atmosphere at a pre-carbide-forming temperature under such conditions as to produce a microsphere composition having sufficient carbon as to create a substantially continuous carbon matrix and a metal-carbide or an oxide-carbide mixture as a dispersed phase(s) during carbide-forming conditions, and then heating the thus treated charge to a carbide-forming temperature.

4 Claims, 3 Drawing Figures

PROCESS FOR PREPARING METAL-CARBIDE-CONTAINING MICROSPHERES FROM METAL-LOADED RESIN BEADS

BACKGROUND OF THE INVENTION

The invention described herein was made in the course of, or under, a contract with the United States Atomic Energy Commission.

The present invention relates to an improved process for treating or converting certain metal-loaded ion-exchange resin microspheres into microspheres consisting of a porous carbon or graphite matrix containing a dispersed metal carbide or metal oxide-carbide phase(s). In the context of this invention, microsphere refers to a spheroidal particle ranging from 5 to 2000 microns in diameter; ion-exchange resin refers to spheroidal, weakly acidic, porous, cation-exchange resins having carboxylic acid exchange sites, said resin consisting of copolymers of acrylic or methacrylic acid and divinyl benzene. Such resins are available commercially as represented by Amberlite IRC-72, available from Rohm & Haas Company, Philadelphia, Pa.

It has previously been propoed to utilize carbonized or graphitized fissile and/or fertile metal-loaded proposed resin microspheres as nuclear fuel where the metal is selected from uranium, thorium, or plutonium, or mixtures thereof and where the metal exists as an oxide, carbide, or oxide-carbide mixture dispersed within a carbon or graphite matrix. A process for the formation of microspheroidal nuclear fuels derived from spheroidal ion-exchange resin beads or microspheres is described in S. N. 48,579 of common assignee. Resin-derived fuels have the potential merits of being fairly cheap to produce, of resulting in a porous spheroidal product, and of being amenable for deposition of pyrolytic carbon coatings to retain fission products. The coated particles are amenable for reprocessing for recovery of unburnt fuel and separation from fission products. There are, however, operatonal difficulties in forming carbide fuels derived from weak-acid resins which must be overcome in order to realize the full potential of such fuels. In order to make a carbide fuel from a metal-loaded resin it must be heated (i.e., carbonized) to a temperature in the range of 1100°–1200°C. in a fluidizing inert atmosphere such as argon or helium to convert the resin to carbon while the metal is retained as an oxide. Thereafter, the carbonized microspheres are heated to a temperature in the range of 1200°–2000°C. in an inert fluidizing gas for a time sufficient to obtain a desired conversion of the oxide to carbide. Experience has shown that carbonization of the metal-loaded resin to carbideforming temperatures can result in extensive particle agglomeration accompanied by loss of sphericity and porosity. Furthermore, production of a controlled proportion of carbide is difficult. These effects are attributable to sintering of the oxide, or carbide components of the carbonizing resin microspheres. Moreover, since different increments of a given charge of imperfectly fluidized resin particles are subject to slightly varying degrees of sintering, the resultant particles can be non-uniform in size, shape, and porosity. It is important in this technology that a given charge of product microspheres be as uniform as possible in these respects.

SUMMARY OF THE INVENTION

It is accordingly a general object of this invention to provide a process by which the aforementioned adverse sintering effects are avoided.

A principal object of this invention is to provide a process for converting spheroidal or spherical metal-loaded weak-acid resin microspheres to spherical or spheroidal particles consisting of a porous carbon or graphite matrix containing a dispersed phase of a metal carbide such as uranium carbide, $UC_x$, where $x$ is a number ranging from 1 to 2, or a mixture of $UC_x$ with $UO_2$.

Another object is to provide a process for producing uniform particles of the character described.

Other similar and related objects will become apparent from the ensuing description.

The present invention is predicated on the discovery of conditions which prevent adverse sintering effects by defining such conditions which ensure the existence of a continuous carbon phase during the carbide-forming process. More particlarly, this invention is based on the discovery that the pre-carbide carbonization heating rate will determine whether or not adverse sintering will occur during carbide formation. The invention can be illustrated utilizing Amberlite IRC-72 in a representative embodiment with reference to the accompanying drawings in which.

Figure 1:
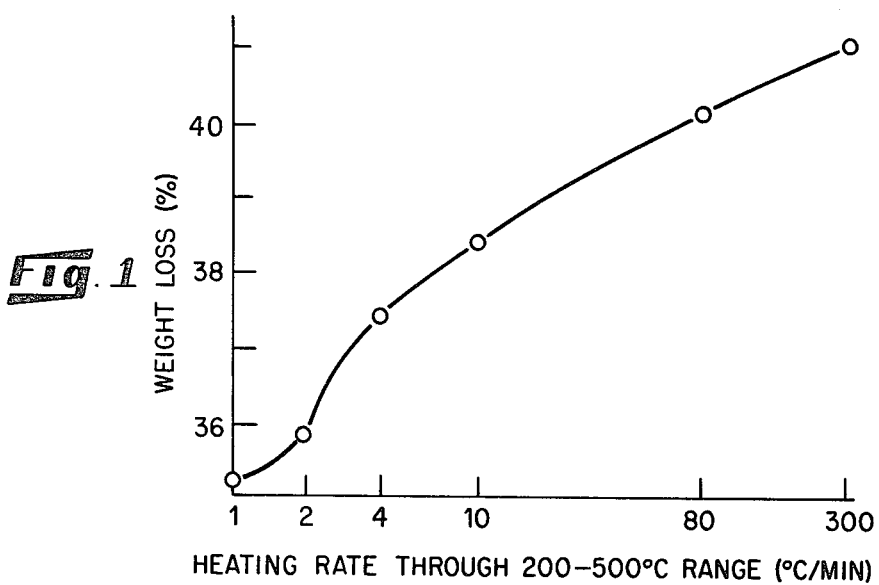
FIG. 1 shows the change in weight which a fluidized charge of uranium-loaded IRC-72 resin undergoes while it is carbonized (heated in an argon atmosphere which provides the fluidizing medium) to a temperature of 1200°C.
Figure 2:
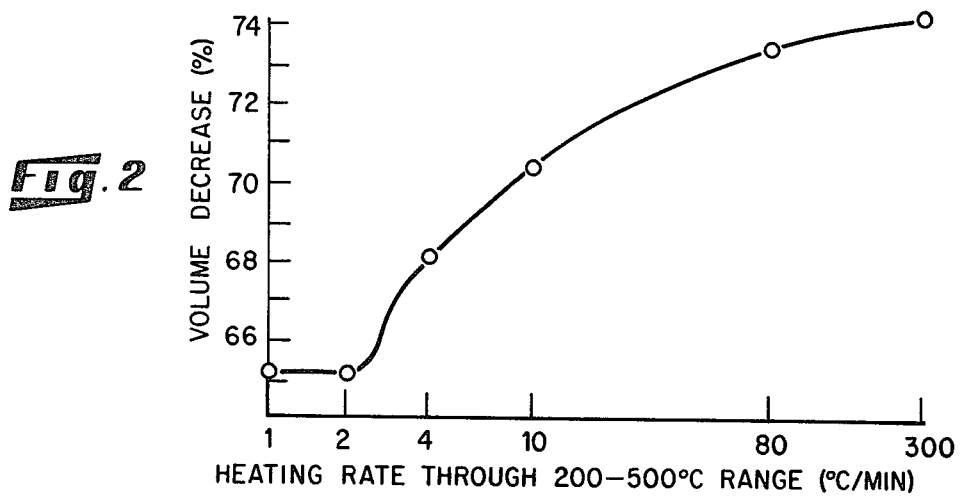
FIG. 2 shows the effect of the heating rate upon the change in volume under the same conditions.
Figure 3:
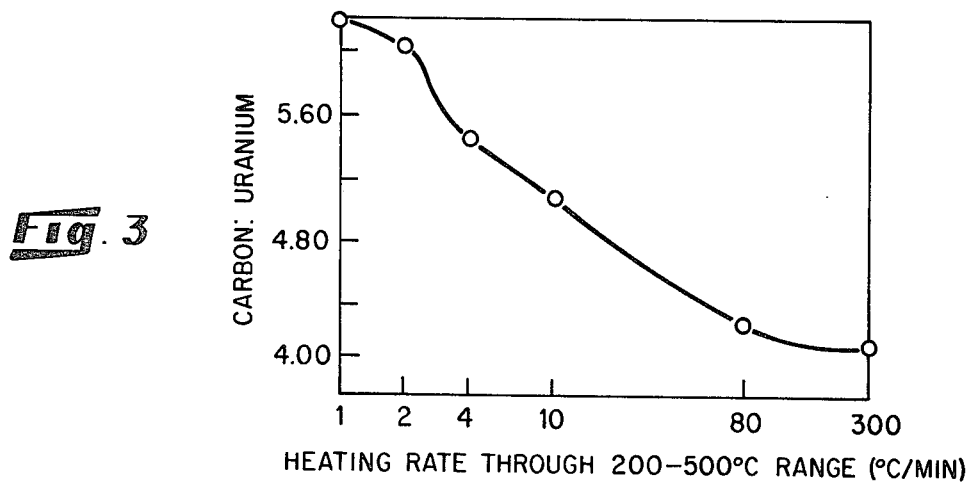
FIG. 3 shows the effect of heating rate through the temperature range 200°–500°C. on the carbon content (expressed as carbon-to-uranium ratio) in the resin carbonized to 1200°C.

It will be seen from FIGS. 1 and 2 that minimum weight and volume changes occurred at a heating rate of less than 2°C./min. in the temperature range 200°–500°C., the most critical range of carbonization. Heating rates at temperatures outside this range had little effect upon the quality of the ultimate product. By correlating the behavior of particles heated to carbide-forming temperatures of 1200°–2000°C. with the carbon-uranium profile of FIG. 3, it has been found that adverse sintering will be avoided with particles which have been carbonized at a heating rate of less than 2°C./min. in the critical range. As seen from FIG. 3, this is equivalent to a carbon-to-uranium ratio of about 6 after heating to 1200°C. The excess carbon achieved by the slow rate of carbonization provides a continuous carbon matrix to prevent sintering of particles during the formation of metal carbides. On the other hand, when the heating rate exceeds 2°C./min. in the critical range, it is found that the carbon-to-uranium ratio drops rapidly and is reflected by adverse sintering at carbide-forming temperatures. The adverse sintering is attributed to the lack of a continuous carbon phase which surrounds and insulates the carbide particles from each other.

When sufficient carbon is retained during pre-carbide heat treatment, a carbon-to-uranium ratio sufficient to ensure the existence of a continuous carbon phase surrounding the carbide particles is maintained. The result is that sphericity as well as a considerable measure of the original porosity of the resin spheres is retained in the final spheroidal fuel particles. The carbide particles will not agglomerate or cling to the wall of the fluidizing bed chamber during conversion of the uranium-loaded resin to a carbide-carbon matrix fuel. Because agglomeration is eliminated and open porosity is retained, closer control can be maintained over the degree of conversion of the metal oxide to its corresponding carbide in a fluidized bed. In a process characterized by particle agglomeration, the carbide conversion is essentially a solid-state-diffusion-controlled process, whereas in the case where the fluidized particles do not adversely sinter and thereby agglomerate during the carbide-forming process in the fluidized bed, carbide conversion rate can be conveniently controlled by gas sweep rate and the partial pressure of CO at a given temperature in accordance with the general equation $UO_2 + 4C \rightarrow UC_2 + 2CO$.

In the particular case of the IRC-72 resin, I have found it essential to pretreat the resin at a heating rate which does not exceed 2°C./min. in the temperature range of 200°–500°C. to ensure a carbon-to-uranium ratio which will avoid adverse sintering during carbide-forming temperatures (1200°–2000°C.). In that case the heating rate is so critical that a 3°C./min. rise already is reflected in adverse sintering and agglomeration of carbonized resin particles during carbide-forming temperatures. However, the scope of my invention is not limited to the specific conditions required to avoid adverse sintering with IRC-72, but is rather to be viewed as based on the recognition that carbonization schedules which precede carbide formaion have a profound and critical effect on the sintering behavior of metal-loaded weak-acid resin beads at carbide-forming temperatures. Pre-carbide heat treatment of other weak-acid resins may differ in the exact heating rate needed to ensure prevention of adverse sintering, so long as the pre-carbide treatment provides sufficient amounts of carbon to ensure the existance of a continuous carbon matrix during carbide-forming temperatures. And, while the invention has been described and exemplified in terms of uranium, it should be understood that other metals such as boron; cadmium; rare earth metals including yttrium, those having an atomic number in the range 58 to 71; actinide earth metals, those having an atomic number in the range 90 to 105, particularly thorium and plutonium; as well as other heavy metals may be usefully incorporated in spherules of the kind described, in carbide form and as a dispersed phase within a carbon matrix.

What is claimed is:

1. In a method of converting a metal contained in a charge of weak-acid resin microspheres into its corresponding carbide, the improvement which comprises heating said metalloaded resin charge in an inert atmosphere at a temperature in the range 200°–500°C at a rate which results in carbonizing the resin to create a metal-loaded carbonized microsphere within a carbon matrix, said carbonized microsphere having a carbon to metal ratio of no less than about 6 and then heating the carbonized microspheres to a carbide-forming temperature in the range 1200°–2000°C to convert the metal within said matrix to its corresponding carbide.

2. The method according to claim 5 in which the resin microspheres are derived from copolymers of acrylic acid, or methacrylic acid and divinyl benzene.

3. The method according to claim 5 in which the resin microspheres are IRC-72 and are heated at a temperature in the range 200°–500°C. at a rate which does not exceed 2°C./min. and then heated in a fluidized bed at a temperature in the range 1200°–2000°C. to convert the metal moiety into a corresponding metal carbide existing as a dispersed phase within a substantially continuous carbon matrix.

4. The method according to claim 5 in which the metal is selected from the group consisting of rare earth and actinide metals.

* * * * *